(12) United States Patent
Gong

(10) Patent No.: US 7,131,683 B1
(45) Date of Patent: Nov. 7, 2006

(54) SHADE ASSEMBLY FOR AUTOMOBILE WINDOW

(76) Inventor: Jing-Shyong Gong, 5F., No. 122, Raohe St., Songshan District, Taipei City (TW)

( * ) Notice: Subject to any disclaimer, the term of this patent is extended or adjusted under 35 U.S.C. 154(b) by 0 days.

(21) Appl. No.: 11/162,974

(22) Filed: Sep. 29, 2005

(51) Int. Cl.
  *B60J 3/00* (2006.01)
(52) U.S. Cl. ............... 296/97.9; 296/97.1; 160/368.1; 160/369; 160/371; 160/391; 160/395
(58) Field of Classification Search ............... 296/97.1, 296/97.2, 97.7, 97.9; 160/354, 368.1, 369, 160/370.21, 371, 391, 395
See application file for complete search history.

(56) References Cited

U.S. PATENT DOCUMENTS

| | | | |
|---|---|---|---|
| 4,886,104 A | * | 12/1989 | Eldridge, Jr. ............... 296/97.7 |
| 5,042,551 A | * | 8/1991 | Ein et al. ............... 160/370.21 |
| 5,044,686 A | * | 9/1991 | Acenbrack ............... 296/97.7 |
| 5,064,239 A | * | 11/1991 | Folcik ............... 296/97.7 |
| 2005/0104408 A1 | * | 5/2005 | Capps ............... 296/97.7 |

* cited by examiner

*Primary Examiner*—Lori L. Coletta
(74) *Attorney, Agent, or Firm*—Alan D. Kamrath; Nikolai & Mersereau, P.A.

(57) ABSTRACT

A shade assembly includes a plurality of fastening blocks and a shade with a flexible frame. Each of the plurality of the fastening blocks is adhered onto a top edge or a bottom edge of a window frame of an automobile and has a lengthwise groove with a narrower opening for receiving the shade. Thus, the shade doesn't need to be removed when lifting or lowering the side window. Further, the shade can be easily removed because of the flexible frame.

4 Claims, 4 Drawing Sheets

SHADE ASSEMBLY FOR AUTOMOBILE WINDOW

BACKGROUND OF THE INVENTION

1. Field of Invention

The present invention relates to shades and, more particularly, to an improved shade assembly having fastening blocks adhered onto a top edge and a bottom edge of a window frame of an automobile for receiving a shade.

2. Related Art

A variety of shades for automobile windows (e.g., side windows) are commercially available. For example, there is one type of shade adapted to be adhered to a side window of a car by taking advantage of static. Also, there is another type of shade adapted to be adhered to a side window of a car by taking advantage of suction cups. However, both types of prior art suffered from a disadvantage. That is, the shade has to be removed prior to lifting or lowering the side window since it is directly adhered on the window. This is quite inconvenient. Thus, a need for improvement exists.

SUMMARY OF THE INVENTION

It is therefore an object of the present invention to provide a shade assembly comprising a plurality of fastening blocks and a shade with a flexible frame. Each of the plurality of the fastening blocks is adhered onto a top edge and a bottom edge of a window frame of an automobile and has a lengthwise groove with a narrower opening for receiving the shade. Thus, the shade doesn't need to be removed when lifting or lowering the side window. Further, the shade can be easily removed because of the flexible frame.

The above and other objects, features and advantages of the present invention will become apparent from the following detailed description taken with the accompanying drawings.

DETAILED DESCRIPTION OF THE INVENTION

Figure 1:
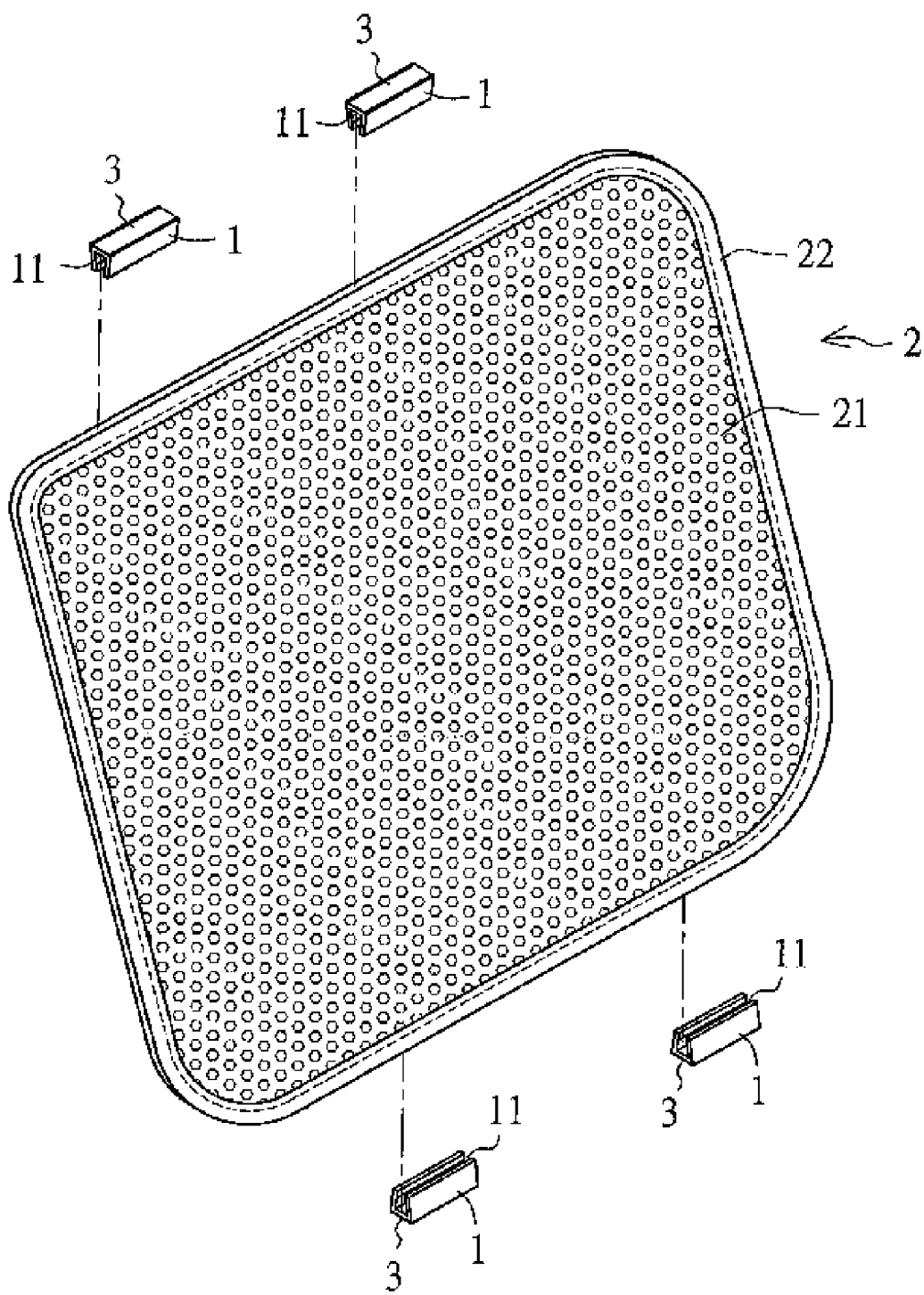
FIG. 1 is an exploded view of a preferred embodiment of a shade assembly according to the invention.

Referring to FIG. 1, a shade assembly for an automobile window in accordance with a preferred embodiment of the invention comprises a plurality of (e.g., four) fastening blocks 1 and a shade 2. Each fastening block 1 has a lengthwise groove 11 with a narrower opening and a double-sided adhesive tape 3 with one side of the double-sided adhesive tape 4 adhered to the bottom of the fastening block 1. The shade 2 is shaped to conform to a side window of an automobile 4 and has an opaque member 21 and an enclosed flexible frame 22 formed of elastomeric material surrounding the opaque member 21 by stitching.

Figure 2:
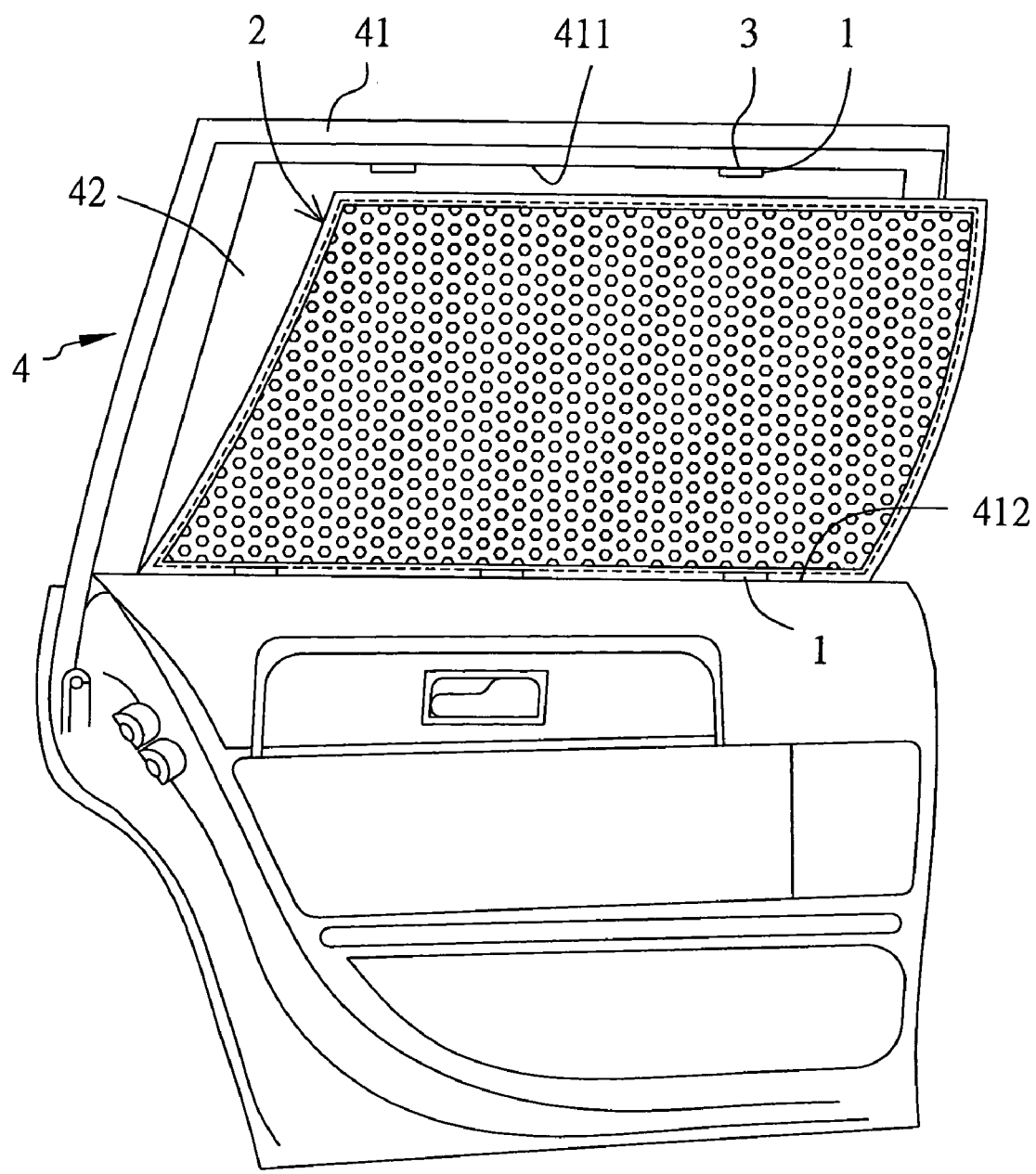
FIG. 2 is an environmental view of the shade assembly being mounted onto a side window of a car.
Figure 3:
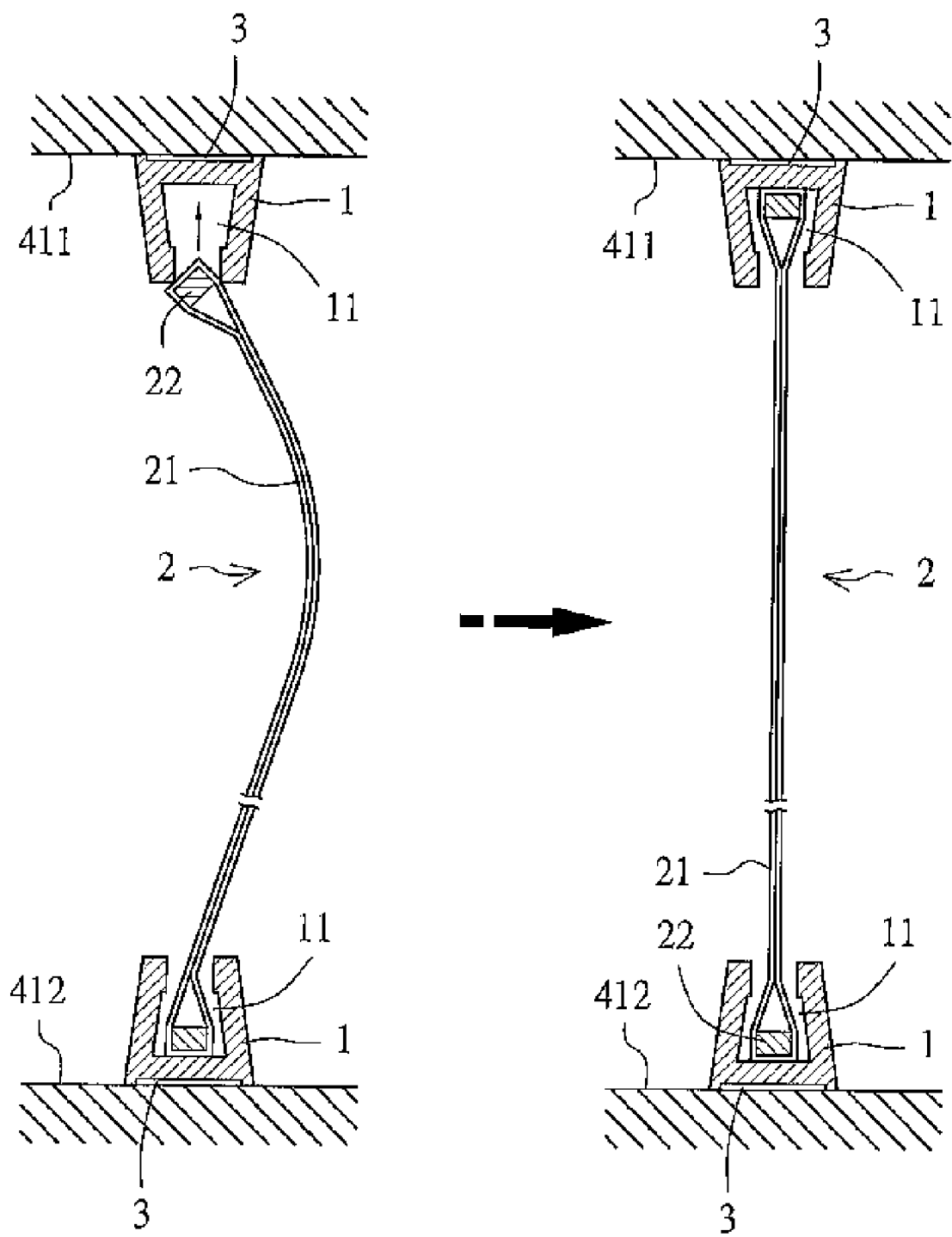
FIG. 3 is a sectional view schematically depicting two steps of mounting the shade assembly onto the side window of car.

Referring to FIGS. 2 and 3, an operation of mounting the shade assembly in an automobile window will be described in detail below. First, the release liners are torn off the other side of the double-sided adhesive tapes 3 adhered to the fastening blocks 1. The fastening blocks 1 are adhered onto a top edge 411 and a bottom edge 412 of a window frame 41 of an automobile 4 for fastening the fastening blocks 1. Next, one of the lower or upper frame elements of the frame 22 is pressed into the grooves 11 of the corresponding fastening blocks 1 for positioning of the shade 2. Next, the first and second side frame elements extending between the lower and upper frame elements of the shade 2 are bent prior to inserting the other of the lower or upper frame elements of the frame 22 into the grooves 11 of the corresponding fastening blocks 1 for positioning of the shade 2 relative to the side window of the automobile. Specifically, the frame 22 has a flexibility allowing bending into arcuate shapes while returning to a linear configuration in a nonstressed condition. There is a gap between the mounted shade 2 and the side window 42 so that there is no interference with the lifting or lowering operation of the side window 42.

Figure 4:
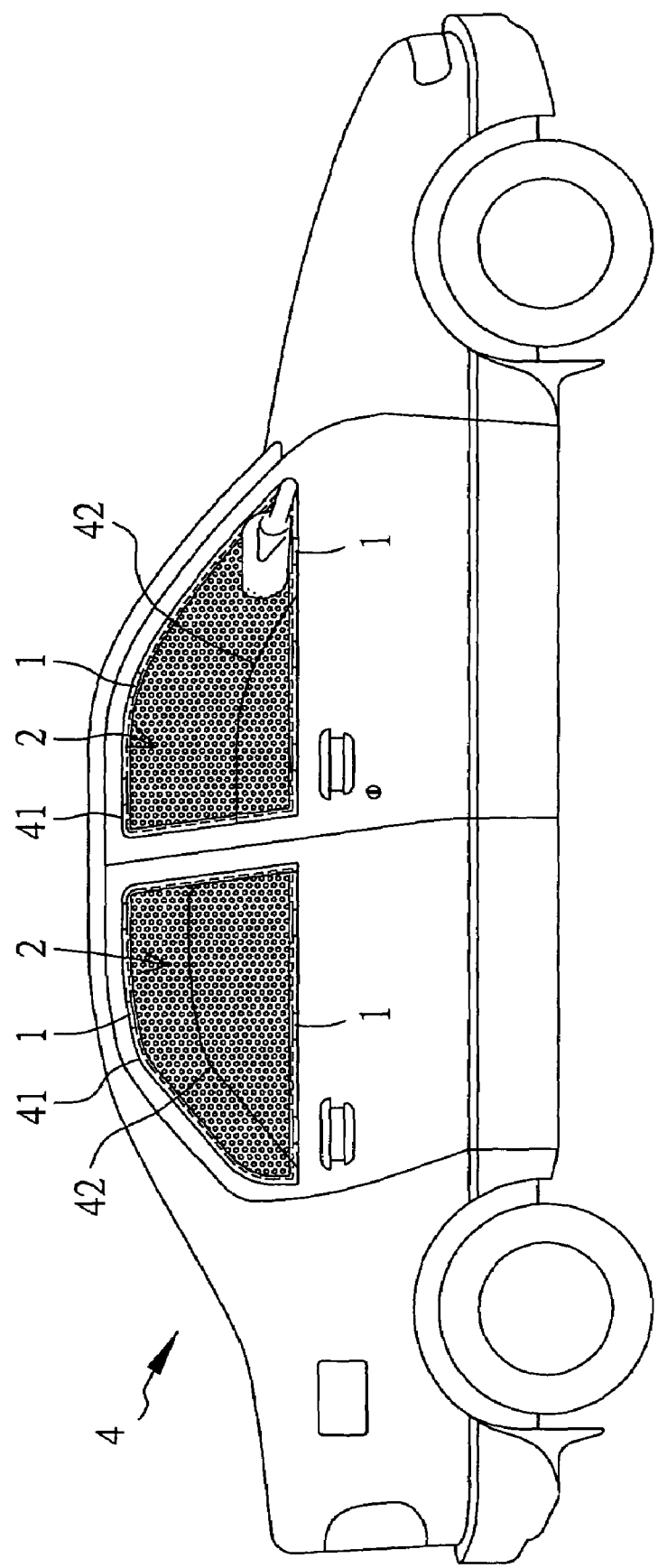
FIG. 4 is a side view of a car having two side windows being mounted with two shade assemblies of the invention.

Referring to FIG. 4, a driver does not have to remove the shade 2 when lifting or lowering the side window 42. It is obvious that for removing the shade assembly, the steps discussed with reference to FIGS. 2 and 3 are reversed.

While the invention herein disclosed has been described by means of specific embodiments, numerous modifications and variations could be made thereto by those skilled in the art without departing from the scope and spirit of the invention set forth in the claims.

What is claimed is:

1. A shade assembly comprising:
   a side window of an automobile having a window frame including a top edge, a bottom edge spaced from the top edge, and a window moveable within the window frame relative to the top and bottom edges between open and closed positions;
   a plurality of fastening blocks, each of the plurality of fastening blocks having a top including a lengthwise groove with a narrower opening, with each of the plurality of fastening blocks being adhereable with the window frame of the side window of the automobile;
   a shade shaped to conform to the side window of the automobile and having an opaque member and an enclosed flexible frame formed of elastomeric material surrounding the opaque member, with the enclosed flexible frame including a lower frame element, an upper frame element, and first and second side frame elements extending between the lower and upper frame elements, with the first and second side frame elements having a flexibility allowing bending into arcuate shapes while returning to a linear configuration between the lower and upper frame elements in a nonstressed condition;
   with the fastening blocks being adhered onto the top edge and the bottom edge of the window frame of the side window of the automobile and the upper and lower frame elements of the shade being pressed into the grooves of the corresponding fastening blocks for positioning the shade relative to the side window of the automobile by bending the first and second side frame elements and allowing the window to be moved between the open and closed positions while the upper and lower frame elements are pressed in the grooves of the corresponding fastening blocks adhered to the window frame.

2. The shade assembly of claim 1 with each of the plurality of fastening blocks having a bottom including a double-sided adhesive tape with one side adhered to the bottom of the fastening block.

3. The shade assembly of claim 2 with the shade comprising a sheet, with the sheet being folded to encircle the lower frame element about a first fold and to encircle the upper frame element about a second fold, with the sheet abutting itself between the first and second folds.

4. The shade assembly of claim 1 with the shade comprising a sheet, with the sheet being folded to encircle the lower frame element about a first fold and to encircle the upper frame element about a second fold, with the sheet abutting itself between the first and second folds.

* * * * *